Nov. 5, 1968  R. A. SALATHIEL  3,409,868
SYSTEM FOR LOCATING UNDERWATER OBJECTS
Filed March 10, 1967

RICHARD A. SALATHIEL INVENTOR.

BY James E. Reed
ATTORNEY

United States Patent Office 3,409,868
Patented Nov. 5, 1968

3,409,868
SYSTEM FOR LOCATING UNDERWATER OBJECTS
Richard A. Salathiel, Houston, Tex., assignor to Esso Production Research Company, a corporation of Delaware
Filed Mar. 10, 1967, Ser. No. 622,231
9 Claims. (Cl. 340—3)

ABSTRACT OF THE DISCLOSURE

Submerged wellheads and other underwater facilities are located and identified by transmitting acoustic impulses into the water and detecting distinctive pulses returned by reflectors mounted adjacent said facilities.

BACKGROUND OF THE INVENTION

(1) Field of the invention

This invention relates to the location of objects under water and is particularly concerned with the location and identification of underwater wellheads, separators, storage vessels and similar facilities.

(2) Description of the prior art

The production of crude oil and natural gas from wells on the ocean floor has necessitated the development of methods for locating such wells. One such method involves the use of a multiple beam radio system to guide a working boat or other vessel to within a few hundred feet of the wellhead and the use of an acoustic system to locate the well itself. One difficulty with this method is that individual wells in highly developed fields cannot be identified. It has been suggested that each such well be provided with a signal generator that will transmit a coded signal in response to acoustic pulses. Such a system has disadvantages because it requires a battery or similar power source at each wellhead. Even though the system is designed so that little or no power is required until the signal generator is actuated, the maintenance and reliability problems encountered may be severe.

SUMMARY OF THE INVENTION

It has now been found that submerged wellheads, separators, storage vessels and other underwater installations can be readily identified by providing each installation with one or more reflectors which will return a unique coded signal in response to acoustic pulses. The reflectors may consist of metallic discs or similar assemblies which require no underwater power supplies and present no serious maintenance problems. The use of such reflectors in conjunction with an acoustic system and a chart of the field makes it possible for a working boat or other vessel to ascertain its exact position in a multi-well field and move directly to the particular well or other facility desired. This reduces the time which must be spent in searching for particular wells and minimizes the danger of errors in well identification. The invention therefore provides a simple and relatively inexpensive means for locating and identifying underwater objects that might otherwise be difficult to find.

DESCRIPTION OF THE PREFERRED EMBODIMENTS

Figure 1:
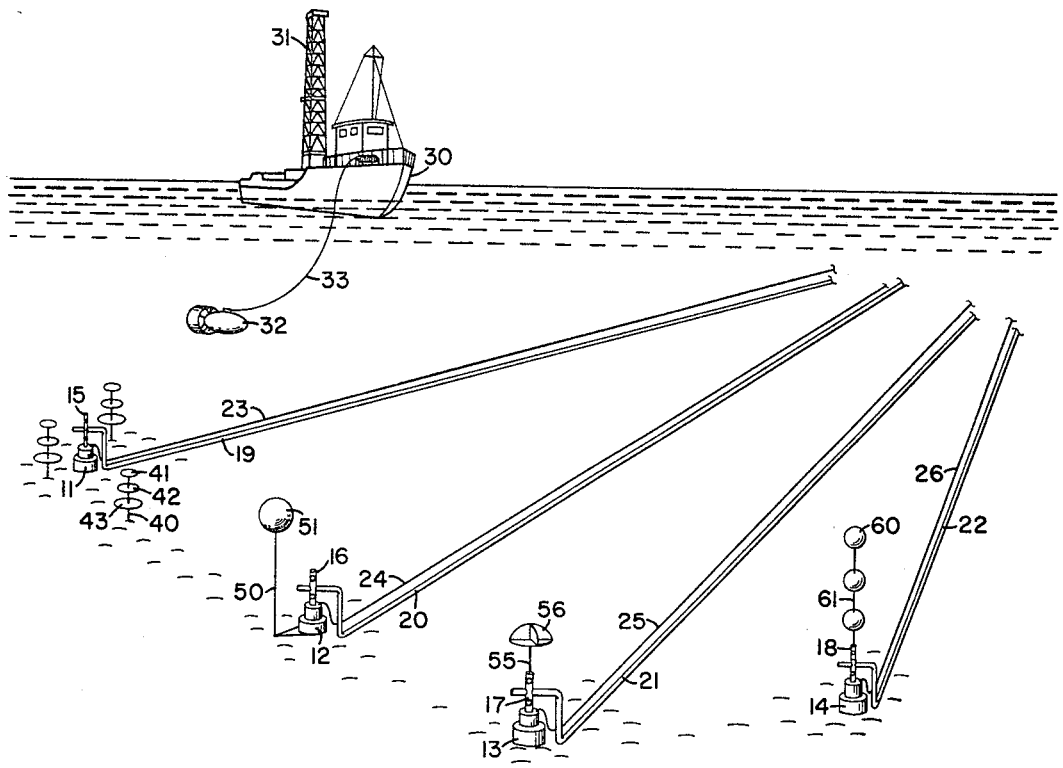
FIGURE 1 in the drawing is a schematic view of a portion of a multiwell oilfield in which each well is provided with reflectors which permit the identification of individual wells and FIGURE 2 illustrates representative signals used for well identification.

The oilfield depicted in part in FIGURE 1 of the drawing is an offshore field completed in several hundred feet of water. Submerged wellheads 11, 12, 13 and 14 are located on the ocean floor at considerable distances from one another. Connectors 15, 16, 17 and 18 are attached to the wellheads. Flowlines 19, 20, 21 and 22 and power and signal cables 23, 24, 25 and 26 extend from the wellheads to a centralized production facility, not shown, which may include a manifolding station, metering devices, separators and other production equipment. The production facility may be located on the ocean floor, on a floating vessel, or on the shore. The wellheads, connectors and flowlines are shown schematically and may be of conventional design.

A vessel 30 shown in FIGURE 1 is floating on the surface of the water above the field. This vessel may be a workover vessel equipped with a derrick 31 for performing drilling, completion and workover operations and with other equipment not shown. A "fish" 32 towed beneath the vessel at the end of electrical cable 33 is used for the generation and detection of acoustic pulses. The fish may include a sound source and one or more separate acoustic receiver arrays or may be of the type in which a single transducer serves as both the source and receiver. Suitable transducers include magnetostrictive devices, piezoelectric crystals, ferromagnetic ceramics, electromagnetically driven diaphragms, and the like. The transducer employed will preferably be a high frequency device designed to generate high intensity acoustic pulses of short duration. The higher frequencies are advantageous in that they permit the detection and identification of relatively small, closely-spaced objects. Apparatus of the side-scan type which permits coverage along a narrow beam over an extended area is particularly effective.

In lieu of using a fish which is towed at the end of a line or cable as shown in FIGURE 1, the invention can be carried out by means of acoustic equipment mounted near the end of a rigid arm or similar member which is lowered through a well in the vessel's hull or lowered over the side of the vessel and can be rotated to permit the transmission of acoustic energy in the desired direction. All of these systems are actuated by electrical signals and convert acoustic energy detected by the transducer or receiver into electrical transients which can be displayed on an oscilloscope or similar device or can be recorded if desired. Suitable acoustic systems are available from a number of manufacturers and will therefore be familiar to those skilled in the art.

Each of the wellhead assemblies shown in FIGURE 1 of the drawing is provided with one or more reflector assemblies designed to reflect unique coded signals in response to acoustic pulses from towed device 32. These reflectors may be mounted on the wellhead assemblies themselves or may be located adjacent the assemblies. Wellhead 11 in FIGURE 1, for example, is provided with three reflector assemblies equally spaced about the wellhead assembly. Each reflector assembly comprises a supporting member 40 which is embedded in the ocean floor, set in a base of concrete or similar material, or attached to a wellhead anchor base. Plates 41, 42 and 43 of metal, hard plastic or similar material are mounted on the supporting member. The material chosen should either be considerably less dense than water or substantially more dense so that the velocity of acoustic energy in the material will be different from that in water. In addition, the thickness should be sufficient to provide strong reflections. The thickness required will depend primarily upon the particular material selected, the configuration of the reflector and the wavelength of the incident energy. In general, very thin plates provide relatively weak reflections and hence it is preferred to employ plates which are a half inch or more in thickness, particularly if a signal of relatively long wavelength is used. Plates several inches thick made of foamed plastic are effective and are relatively inexpensive and easily handled. The plates may be flat but are preferably spherical segments mounted with their convex surfaces facing upwardly so that acoustic energy reaching them from the sides will be reflected. In the assembly shown, the plates are of three different sizes, the smallest plates at the top of the supporting members being about four feet in diameter. The vertical spacing between the individual plates and between the lowermost plate and the ocean floor may be varied, but it is preferred that this spacing be ten feet or more so that pulses reflected from the floor and from each plate will be clearly recognizable.

The reflector assembly associated with wellhead 12 in FIGURE 1 includes a rigid supporting member 50 on which a solid sphere of polyurethane foam or similar material 51 is mounted. The supporting member may be attached to the wellhead assembly as shown or may instead be affixed to an anchor plate or similar member which is not shown in the drawing. The use of a supporting member which extends to one side of the wellhead avoids the necessity for moving the reflector assembly during workover operations. The sphere will preferably be several feet in diameter and should be mounted a known, predetermined distance above the ocean floor or anchor plate surrounding the wellhead. Spheres used in reflector assemblies associated with other wells in the field will be positioned at different distances from the floor or anchor plates. Two or more such spheres may be employed at each wellhead if desired.

The reflector assembly associated with wellhead 13 is mounted on the wellhead assembly itself and comprises a rod 55 to which a corner reflector 56 made up of plates intersecting one another at right angles is attached. Here again the plates employed should be of sufficient thickness to provide strong reflections for the particular wavelength utilized. Such a reflector is advantageous in that it tends to direct the reflected acoustic energy back toward the source and thus provides stronger reflections than may be obtained with other reflector assemblies. The height of the assembly above the ocean floor or anchor plate should be different for each well and should normally be ten feet or more so that the time interval between pulses in the reflected signal will permit the identification of each well. Two or more reflector assemblies may be provided at each wellhead to assure more positive identification.

Wellhead 14 in FIGURE 1 is provided with still another form of reflector assembly. Here a series of vertically-spaced buoys 60 made of rubber or pliable plastic and filled with a gas are held in place by a rod or cable 61 which is in turn attached to the wellhead. Thick walled metal spheres or solid spheres of foamed plastic can be used in lieu of the thin walled, gas-filled spheres if desired. The spacing between the individual spheres and between the lowermost sphere and the ocean floor or anchor plate, which will normally be different for each well, provides the desired coded response.

The acoustic or sonic pulses generated by the transducer in fish 32 move outwardly until they encounter a surface capable of reflecting the pulse energy back to the receiving device. The reflecting surfaces on the reflector assemblies and the ocean floor or anchor plates surrounding the wellheads produce multiple impulses. The number of impulses reflected in response to each pulse transmitted and the spacing between the reflected impulses are distinctive for the reflector assembly associated with each wellhead or similar installation within a given area. The reflected impulses from the assembly at wellhead 11, for example, will normally include closely spaced impulses representing the energy reflected from the plates and later impulses reflected from the ocean floor. Trace 70 in FIGURE 2 of the drawing illustrates such a response. Pulse 71 on the trace, relatively large in amplitude, represents the energy transmitted directly from the transmitter to the receiver; while pulse groups 72, 73 and 74 represent energy reflected from the reflector plates in the reflector assemblies associated with wellhead 11. The pulses in each of the three groups are closely spaced to one another and are substantially greater in amplitude than later pulse 75 representing energy reflected from the ocean floor. The time interval between the individual pulses in each group is primarily a function of the spacing between the individual plates and hence variations in the plate spacing for different wells provides an effective way of identifying the wells. The duration between the pulses from the plates and that from the floor or anchor plate also provides a means of identification. The spacing of the three groups of pulses with respect to each other, on the other hand, is governed primarily by the position of the fish with respect to the reflector assemblies. The three groups will coincide if the acoustic transmitter and receiver are directly above the wellhead so that the travel time between the acoustic apparatus and the reflecting surfaces is the same for all three assemblies. If the transmitter and receiver are displaced from the wellhead but positioned so that the distance to the reflector plates and back is the same for two of the reflector assemblies, two of the pulse groups will coincide. This provides a convenient means for positioning the vessel directly over the wellhead or other installation and in some cases has advantages over the use of a single reflector assembly located on or adjacent the wellhead.

Figure 2:
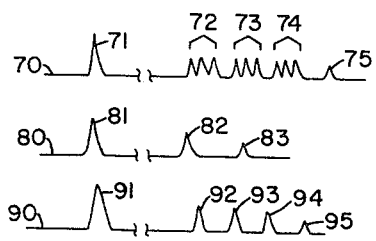

Trace 80 in FIGURE 2 depicts the response from a reflector assembly of the type associated with wellheads 12 and 13. Pulse 81 represents the initial impulse generated by the transducer, pulse 82 represents the energy reflected from sphere 51 or corner reflector 56, and pulse 83 represents energy returned from the ocean floor or an anchor plate surrounding the wellhead. The time interval between pulses 82 and 83 is governed primarily by the distance the reflector is positioned above the floor or anchor plate and hence variations in this interval permit the identification of individual wells.

Trace 90 in FIGURE 2 represents the response from the reflector assembly associated with wellhead 14 in FIGURE 1. Wellhead 14 is provided with three reflecting buoys positioned above the wellhead and hence the response consists of 4 impulses following the initial pulse 91. Impulses 92, 93 and 94 represent energy reflected from the three buoys and attenuated pulse 95 corresponds to energy returned from the ocean floor. The time intervals between these pulses can be varied by varying the vertical positions of the buoys above the wellhead. The absolute values of the time intervals will depend in part upon the position of the source and receiver with respect to the reflector assembly but relative differences between the interval between the pulses from the ocean floor and the lowermost buoy and the interval between the two uppermost buoys, for example, provide a reliable means of identification except when the transducer or transmitter and receiver are directly above the wellhead. In the latter case, the pulses will coincide. This permits accurate positioning of the vessel over the wellhead after the particular well has been identified.

In operating the apparatus shown in FIGURE 1 of the drawing, the transmitter and receiver assembly is towed by vessel 30 at a depth sufficient to avoid interference from the hull and the surface of the water. In some cases, it is advantageous to have the source or transmitter below the zone of rapid temperature change. The transmitter is then actuated periodically to generate acoustic pulses. The acoustic energy which impinges on a reflector assembly and is reflected to the receiver is monitored on an oscilloscope or similar device and may be recorded if desired. Pulses reflected from the ocean floor or from fish and the like will normally be much more attenuated than those representing energy from the reflector assemblies associated with wellheads or other facilities and can be distinguished from the latter. By noting the particular response obtained when pulses indicative of a submarine installation are detected and referring to a chart of the field, the position of the vessel in the field can be readily determined without further searching. The vessel can then be moved to the desired location in the field. Once this position is obtained and confirmed by impulses reflected from the reflector assembly associated with the particular facility desired, workover activities or other operations can be carried out in the normal manner.

It will be apparent that the invention provides an effective means for the location and identification of underwater wellheads and similar installations utilized in the petroleum and mining industries. The system described is particularly advantageous in that it does not require the use of underwater power sources, does not utilize releasable members which may become fouled by corrosion and marine growth, and does not require extensive maintenance at frequent intervals. These and other advantages make the system useful for many applications where earlier systems are not practical.

I claim:

1. An underwater development containing a plurality of submarine installations located near the bottom of a body of water at substantial distances from one another, said installations being provided with reflecting members positioned to reflect a different acoustic signal from each installation in response to acoustic pulses transmitted to said installations from a single source in the water above said members.

2. A development as defined by claim 1 wherein said reflecting members are mounted a sufficient distance above the bottom of said body of water to permit pulses reflected from said members and from said bottom to be distinguished from one another.

3. A development as defined by claim 1 wherein said reflecting members comprise plates which extend parallel to the surface of said body of water and have convex upper surfaces, the plates at each installation being vertically spaced from one another a distance sufficient to permit pulses reflected from each plate to be distinguished from those reflected from adjacent plates.

4. A development as defined by claim 1 wherein said reflecting members are corner reflectors having surfaces which intersect one another at right angles.

5. A development as defined by claim 1 wherein said reflecting members at least one of said installations comprise a plurality of vertically spaced spheres.

6. A development as defined by claim 1 wherein said reflecting members are made of a rigid foamed plastic.

7. A development as defined by claim 1 wherein said reflecting members are gas-filled buoyant members.

8. An underwater production facility comprising a plurality of wellheads located near the bottom of a body of water and a plurality of underwater acoustic reflector assemblies associated with said wellheads for identifying individual wells, each of said reflector assemblies including at least one reflector member positioned at sufficient distance above the bottom of said body of water to reflect a distinct acoustic pulse in response to a pulse from an acoustic source in the water above said member and the positions of said reflector members being sufficiently different on the different assemblies to produce a different signal from each assembly in response to identical pulses from said source.

9. A facility as defined by claim 8 wherein said reflector assemblies are mounted on the wellheads.

References Cited

UNITED STATES PATENTS

| | | | |
|---|---|---|---|
| 2,461,181 | 2/1949 | Rosenberg | 340—8 |
| 2,465,993 | 4/1949 | Beechlyn. | |
| 3,014,198 | 12/1961 | Harris | 340—5 |
| 3,054,084 | 9/1962 | Parssinen et al. | 340—8 |
| 3,195,677 | 7/1965 | Hillery et al. | 181—.5 |
| 3,222,634 | 12/1965 | Foster | 340—3 |
| 3,273,146 | 9/1966 | Hurwitz | 343—6.8 |

RICHARD A. FARLEY, *Primary Examiner.*